(12) United States Patent
Richter

(10) Patent No.: US 10,792,128 B2
(45) Date of Patent: Oct. 6, 2020

(54) ORTHODONTIC SETTLING RETAINER

(71) Applicant: Richter Orthodontics, P.C., Greeley, CO (US)

(72) Inventor: David D. Richter, Greeley, CO (US)

(73) Assignee: Richter Orthodontics, P.C., Greeley, CO (US)

( * ) Notice: Subject to any disclaimer, the term of this patent is extended or adjusted under 35 U.S.C. 154(b) by 0 days.

(21) Appl. No.: 15/828,064

(22) Filed: Nov. 30, 2017

(65) Prior Publication Data

US 2019/0159869 A1 May 30, 2019

(51) Int. Cl.
A61C 7/08 (2006.01)
A61C 7/00 (2006.01)
A61C 13/00 (2006.01)
A61C 7/12 (2006.01)

(52) U.S. Cl.
CPC ............ *A61C 7/08* (2013.01); *A61C 13/0019* (2013.01); *A61C 7/002* (2013.01); *A61C 7/12* (2013.01)

(58) Field of Classification Search
CPC ......... A61C 7/00; A61C 7/0836; A61C 7/145; A61C 7/08; A61C 7/36; A61C 7/002; A61C 7/12
USPC ....................................... 433/6, 7, 18, 19, 24
See application file for complete search history.

(56) References Cited

U.S. PATENT DOCUMENTS

| 646,629 | A | * | 4/1900 | Sugatt | A61C 7/08 433/6 |
| 4,253,828 | A | * | 3/1981 | Coles | A61C 7/00 433/6 |
| 4,413,978 | A | | 11/1983 | Kurz | |
| 5,002,485 | A | | 3/1991 | Aagesen | |
| 5,096,416 | A | | 3/1992 | Hulsink | |
| 5,340,656 | A | | 8/1994 | Sachs et al. | |
| 5,387,380 | A | | 2/1995 | Cima et al. | |
| 5,536,169 | A | | 7/1996 | Yousefian | |
| 5,692,894 | A | | 12/1997 | Schwartz et al. | |
| 5,938,436 | A | * | 8/1999 | Shevel | A61F 5/566 128/860 |
| 6,371,759 | B1 | | 4/2002 | Schwartz | |
| 6,435,871 | B1 | * | 8/2002 | Inman | A61C 7/00 433/21 |
| 6,505,628 | B2 | | 1/2003 | Kittelsen et al. | |
| 6,572,372 | B1 | * | 6/2003 | Phan | A61C 7/00 433/18 |
| 6,658,314 | B1 | | 12/2003 | Gothait | |
| 7,037,382 | B2 | | 5/2006 | Davidson et al. | |
| 7,500,846 | B2 | | 3/2009 | Eshed et al. | |
| 7,604,768 | B2 | | 10/2009 | Kritchman | |

(Continued)

OTHER PUBLICATIONS

Excel Orthodontics. Hawley Retainers. Website, http://www.excelorthodontics.com, originally downloaded Jan. 23, 2018, 4 pages total.

(Continued)

*Primary Examiner* — Edward Moran
*Assistant Examiner* — Matthew P Saunders
(74) *Attorney, Agent, or Firm* — Craig R. Miles; CR Miles P.C.

(57) ABSTRACT

A dental retainer including one or more of a retaining body having a plurality of dental impressions to receive teeth, a pair of passthrough openings to allow passage of one or more molars, premolars, and canines, and an aperture disposed adjacent the lingual surface of the incisors.

14 Claims, 11 Drawing Sheets

(56) References Cited

U.S. PATENT DOCUMENTS

| | | | |
|---|---|---|---|
| 7,905,724 B2 | 3/2011 | Kuo et al. | |
| 7,963,766 B2 * | 6/2011 | Cronauer | A61C 7/00 433/6 |
| 8,348,665 B2 | 1/2013 | Kuo | |
| 8,469,706 B2 | 6/2013 | Kuo | |
| 8,827,696 B1 * | 9/2014 | Sandwick | A61C 3/00 433/6 |
| 10,028,805 B2 * | 7/2018 | Tairaku | A61C 7/08 |
| 2003/0190576 A1 * | 10/2003 | Phan | A61C 7/00 433/6 |
| 2005/0037312 A1 * | 2/2005 | Uchida | A61C 5/007 433/6 |
| 2006/0110698 A1 * | 5/2006 | Robson | A61F 5/566 433/6 |
| 2009/0130635 A1 | 5/2009 | Tortorici | |
| 2009/0197217 A1 * | 8/2009 | Butscher | A61K 31/198 433/20 |
| 2013/0122444 A1 * | 5/2013 | Griffiths | A61C 7/08 433/6 |
| 2015/0224305 A1 * | 8/2015 | Davidovitch | A61N 1/205 433/6 |
| 2016/0081767 A1 * | 3/2016 | Metcalf | A61C 7/10 433/6 |
| 2016/0081769 A1 * | 3/2016 | Kimura | A61C 7/10 433/6 |
| 2017/0258554 A1 * | 9/2017 | Hung | A61C 7/08 |
| 2019/0046801 A1 * | 2/2019 | Zamorano | A61N 1/36067 |

OTHER PUBLICATIONS

PCT International Patent Application No. PCT/US18/59683; International Search Report and Written Opinion of the International Searching Authority dated Jan. 29, 2019, 20 pages.

\* cited by examiner

ORTHODONTIC SETTLING RETAINER

FIELD OF THE INVENTION

A dental retainer including one or more of a retaining body having a plurality of dental impressions to receive teeth, a pair of passthrough openings adapted to allow passage of one or more molars, premolars, and canines, and an aperture disposed adjacent the lingual surface of the incisors.

SUMMARY OF THE INVENTION

A broad object of the present invention is to provide a dental retainer having one or more of a retainer body having a plurality of dental impressions to receive respective teeth in a dental arch, a pair of passthrough openings in the retainer body adapted to correspondingly allow passage of one or more molars, premolars, and canines through the retainer body, and an aperture in the retainer body disposed adjacent the lingual surface of the incisors.

Another broad object of the present invention is to provide a method of making a dental retainer including one or more of producing a retainer body having a plurality of dental impressions to receive respective teeth in a dental arch, disposing a pair of passthrough openings in the retainer body adapted to correspondingly allow passage of one or more molars, premolars, and canines through the retainer body, and disposing an aperture in the retainer body adjacent the lingual surface of the incisors.

Another broad object of the present invention is to provide a method of using a dental retainer including one or more of correspondingly disposing teeth of a dental arch in a plurality of dental impressions of a retainer body, correspondingly passing one or more molars, premolars, and canines in the dental arch through a pair of passthrough openings in the retainer body, and disposing an aperture adjacent the lingual surface of the incisors.

Naturally, further objects of the invention are disclosed throughout other areas of the specification, drawings, photographs, and claims.

DETAILED DESCRIPTION OF THE INVENTION

Referring generally to FIGS. 1 through 11, a dental retainer (1) and methods of making a dental retainer (1) can include producing a retainer body (2) configured to receive the entirety or a portion of the dentition (3) of a dental arch (4). For purposes of this description, reference will first be made to a retainer body (2) produced to receive the dentition (3) of the maxillary dental arch (4A). However, the method of making a dental retainer (1) can, but need not necessarily, further apply to producing a retainer body (2) to receive the dentition (3) of the mandibular dental arch (4B).

Figure 5:
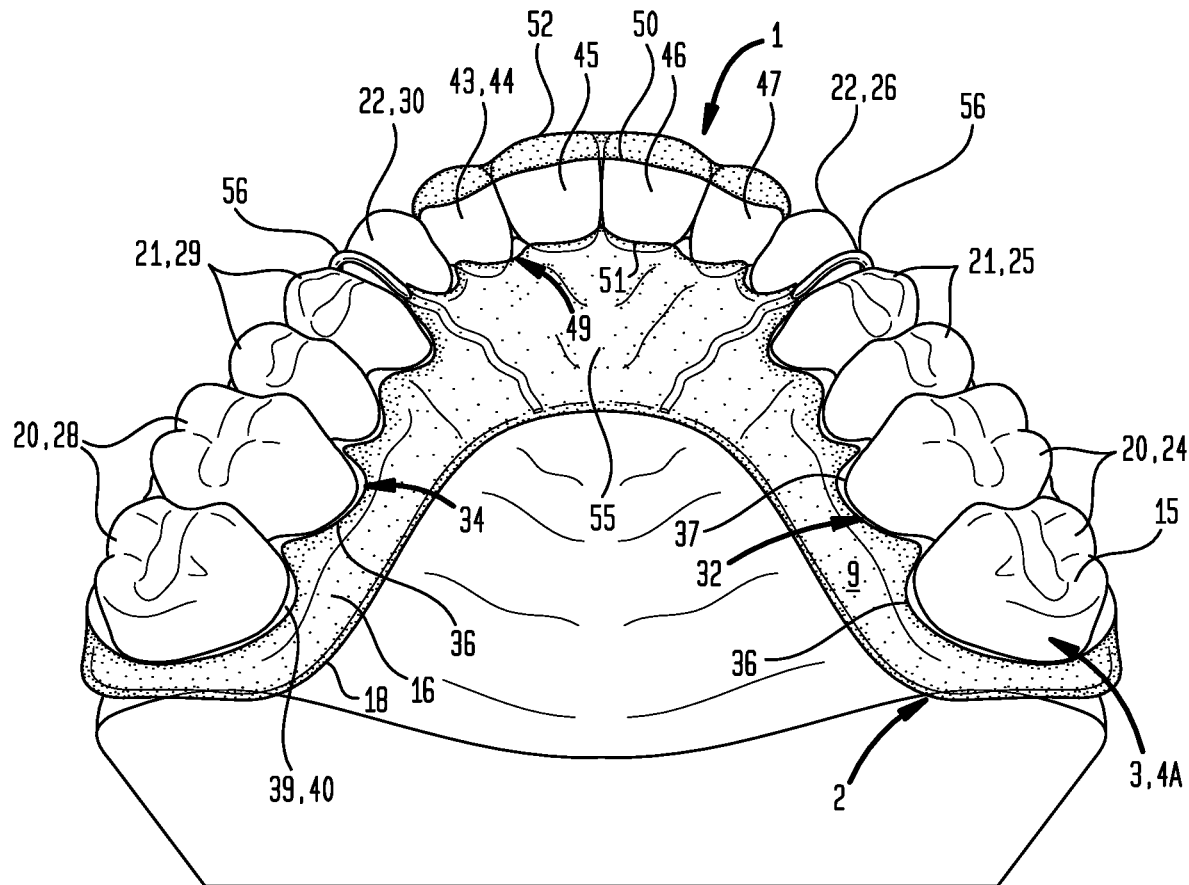
FIG. 5 is a back perspective view of a particular embodiment of a dental retainer disposed on a maxillary dental arch.
Figure 6:
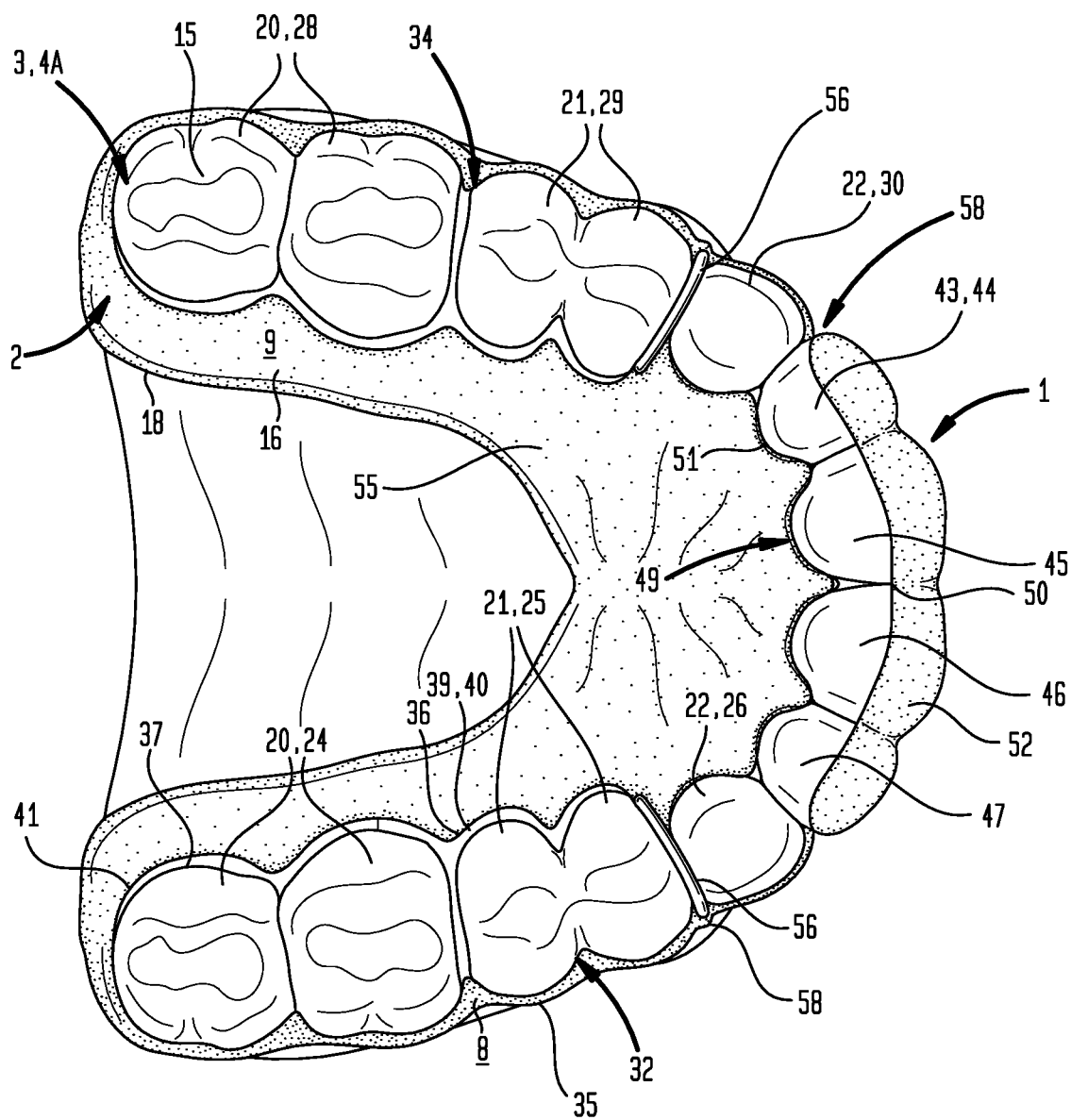
FIG. 6 is a bottom view of a particular embodiment of a dental retainer disposed on a maxillary dental arch.
Figure 7:
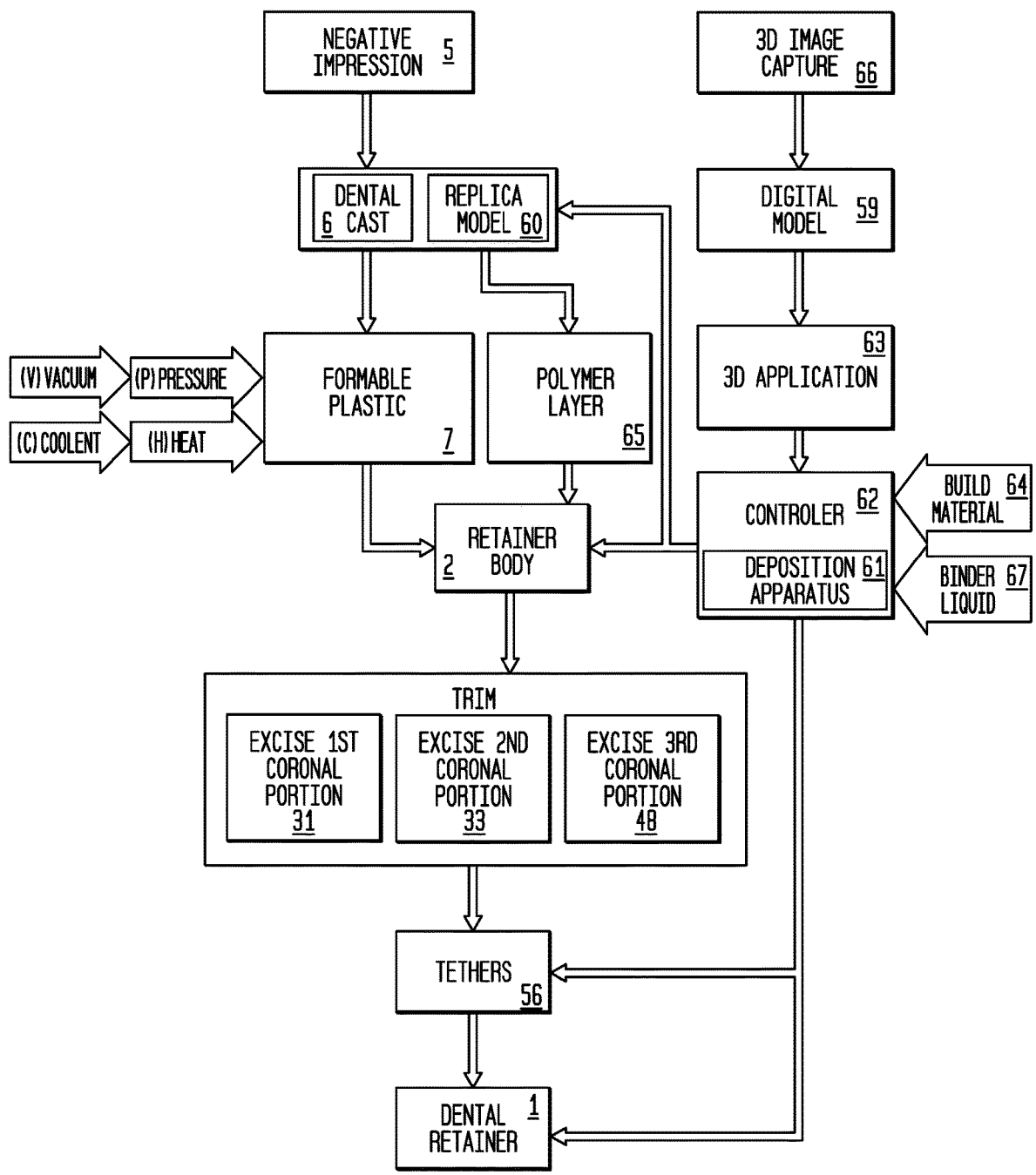
FIG. 7 is a schematic of particular methods of making a dental retainer.

Again, referring generally to FIGS. 1 through 7, with primary reference to FIG. 7 in particular embodiments, the method can include making a negative impression (5) of the dentition (3) (also referred to as "teeth") of the maxillary dental arch (4A) in a dental impression material. The negative impression (5) provides a negative imprint of the dentition (3) of the maxillary dental arch (4A) and surrounding soft tissues in the mouth. An example of a dental impression material useful in embodiments of the method can include or consist of polyvinyl siloxane. The method can further include, producing a dental cast (6) or positive reproduction of the maxillary dental arch (4A) and the surrounding soft tissues can be made from the negative impression (5) of the maxillary dental arch (4A).

Again, referring primarily to FIG. 7, in particular embodiments, the retainer body (2) can be produced by disposing a formable or thermoformable plastic (7) on the dental cast (6). The formable or thermoformable plastic (7) can be formed about the dental cast (6), and as to particular embodiments, one or more of heat (H), vacuum (V) or pressure (P) can be applied to the formable or thermoformable plastic (7) to allow or assist in forming the formable or thermoformable plastic (7) to the configuration of the dental cast (6). In particular embodiments, as the formable or thermoformed plastic (7) sets on the dental cast (6), rapid cooling can, but need not necessarily, be achieved by applying a coolant (C) to the retainer body (2), such as a flow of cool air or water.

Figure 1:
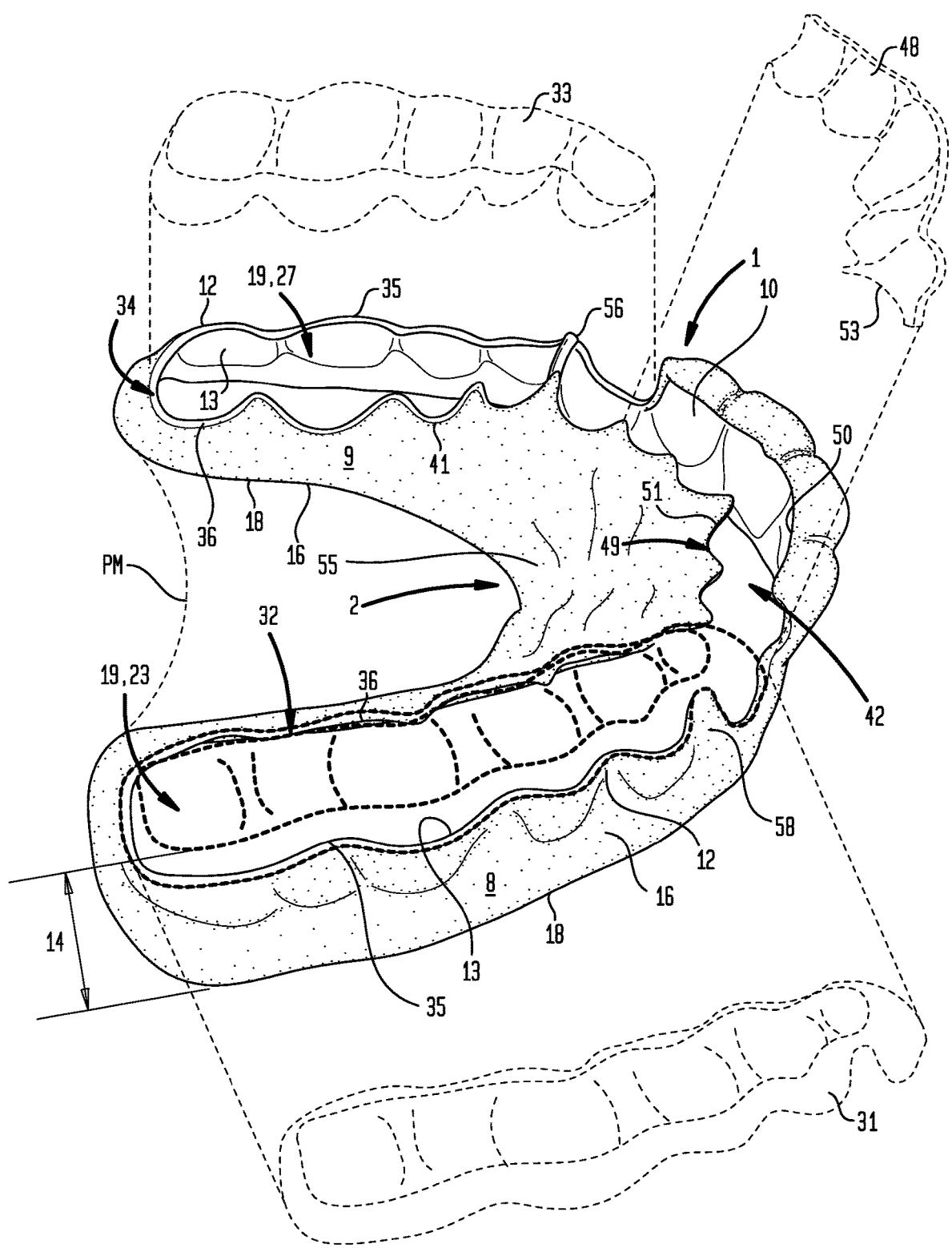
FIG. 1 is a side perspective view of a particular embodiments of a dental retainer for a maxillary dental arch.
Figure 2:
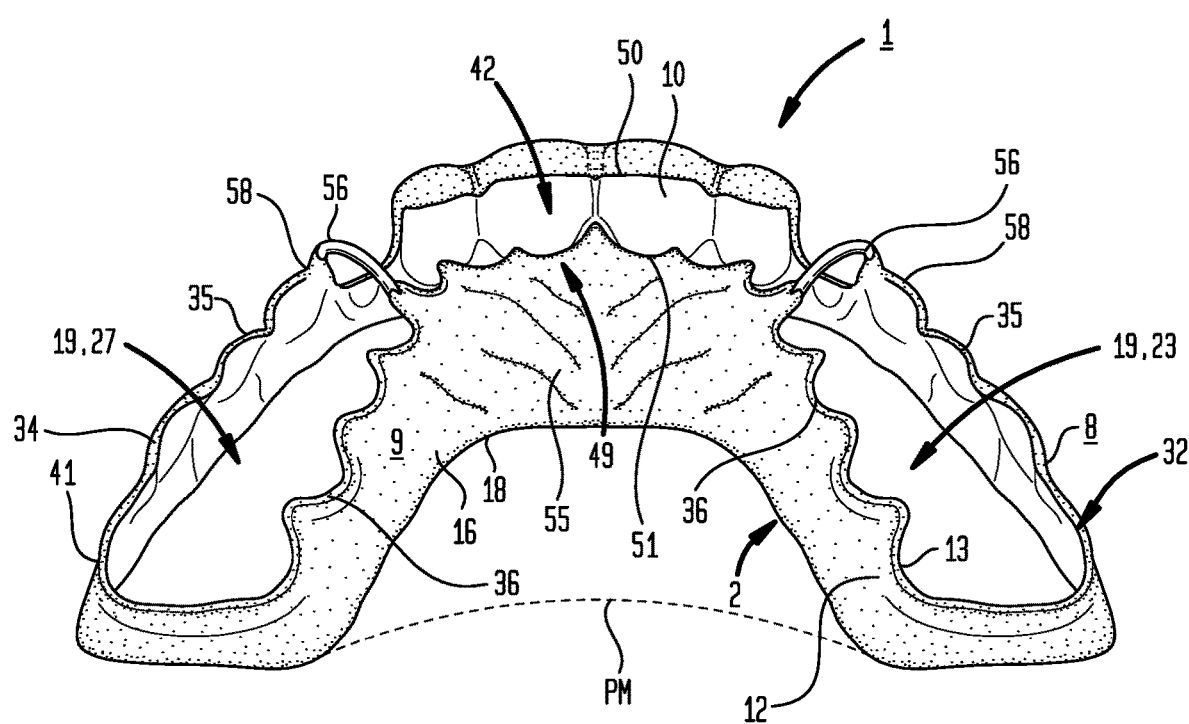
FIG. 2 is a back perspective view of a particular embodiment of a dental retainer for a maxillary dental arch.
Figure 3:
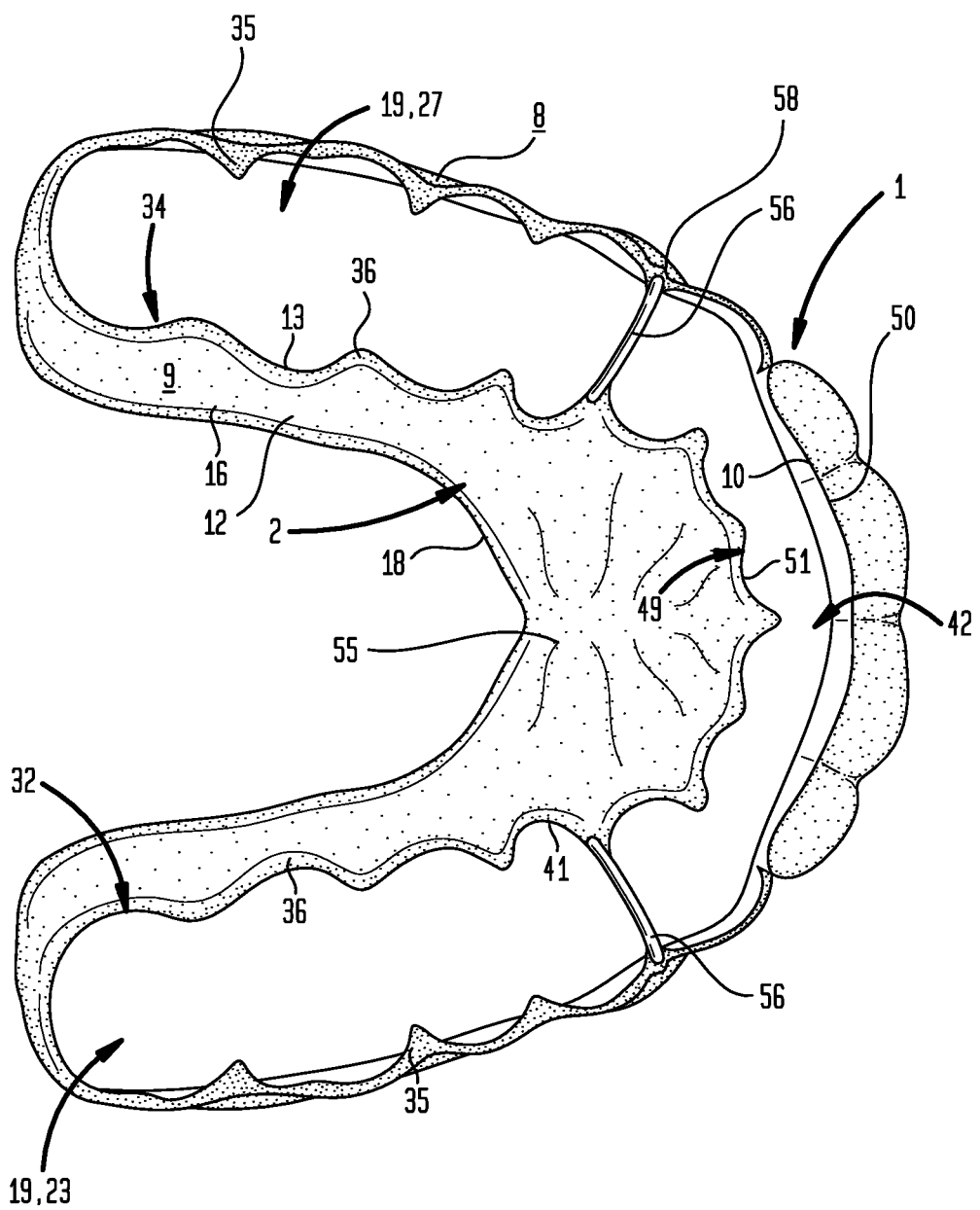
FIG. 3 is a bottom view of a particular embodiment of a dental retainer for a maxillary dental arch.

Now referring primarily to FIGS. 1 through 3 and 7, the resulting retainer body (2) includes a labial surface (8) opposite a lingual surface (9). For purposes of this invention, the term "lingual" refers to a surface abutting or adjacent to (or direction towards) the tongue. For purposes of this invention, the term "labial" refers to a surface opposite the lingual surface adjacent to (or the direction towards) the inside of the cheek or lip. The retainer body (2) can have an outer surface (12) facing the mouth cavity and an inner surface (13) that is adjacent to, abuts or faces the dentition (3) of the dental arch (4) and having a plurality of dental impressions (10) to receive the respective teeth (3) in a dental arch (4). The resulting retainer body (2) can have a depth (14) defined by a distance between the outer surface (12) of the retainer body (2) disposed over the crowns (15) of the teeth (3) and the peripheral edge (18) of the retainer body (2) disposed over a portion of the gums (17) of the patient (as shown in the example of FIG. 1). In particular embodiments, the resulting retainer body (2) can be trimmed to establish the peripheral edge (18) while maintaining a peripheral margin (16) which contacts the gums (17) and a portion of the palate when the teeth (10) are received in the retainer body (2) (as shown in the examples of FIGS. 4 through 6) and extends to the peripheral edge (18), which in part traverses the palate to afford a palatal portion (55) of the retainer body (2), which overlays substantially the entirety of the palate (as shown by broken line "PM" depicted in FIG. 1) or overlays a portion of the palate (as shown in the example of FIGS. 4 through 6).

Figure 4:
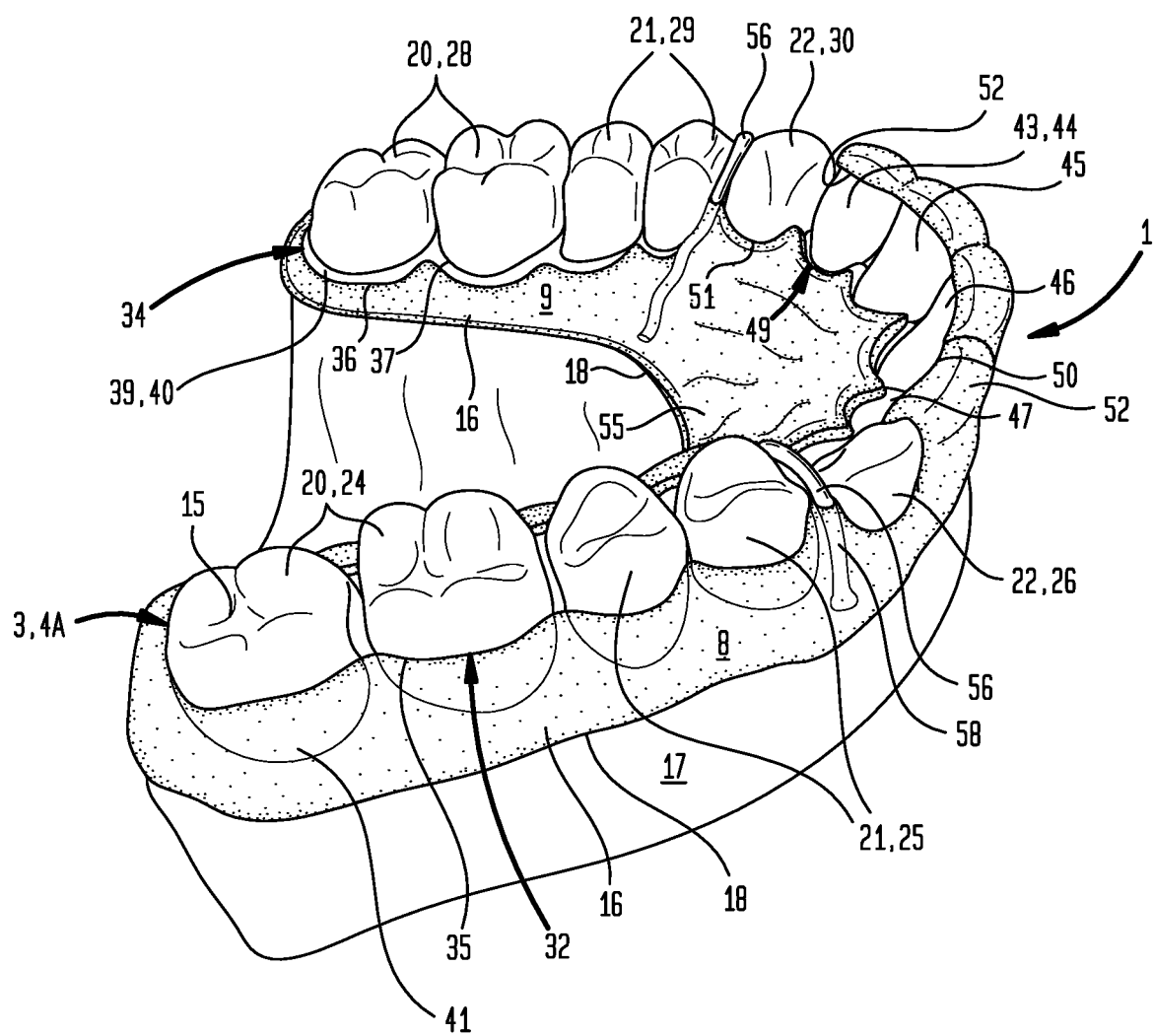
FIG. 4 is a side perspective view of a particular embodiment of a dental retainer disposed on a maxillary dental arch.

Again, referring primarily to FIGS. 1 through 7, the method of making a dental retainer (1) can further include disposing at least one of a pair of passthrough openings (19) in the retainer body (2) (as shown in the illustrative examples of FIGS. 1 through 3), each of the pair of passthrough openings (19) can be adapted to correspondingly allow passage of one or more molars (20), premolars (21), and canines (22) of the teeth (3) in the dental arch through the retainer body (2) (as shown in the example of FIGS. 4 through 6). The pair of passthrough openings (19) can include a first passthrough opening (23) adapted to allow passage of one or more of the left maxillary molars (24), premolars (25) and canines (26). The pair of passthrough openings (19) can include a second passthrough opening (27) adapted to allow passage of one or more of the right maxillary molars (28), premolars (29) and canines (30). Particular embodiments can include only a first or only a second passthrough opening (23) or (27).

Now referring primarily to FIGS. 1 and 7, in particular embodiments, the method can further include excising a first coronal portion (31) of the retainer body (2) overlaying one or more of the left maxillary molars (24), premolars (25), and canines (26) of the teeth (3) in the dental arch (4) to generate a first passthrough periphery (32) which defines the first passthrough opening (23). In particular embodiments, the method can further include excising a second coronal portion (33) of the retainer body (2) overlaying one or more of the right maxillary molars (28), premolars (29), and canines (30) of the teeth (10) in the dental arch (4) to generate a second passthrough periphery (34) which defines the second passthrough opening (27). A first and second passthrough periphery (32)(34) correspondingly defines the open area each of the pair of passthrough openings (19) in the retainer body (2); however, in particular embodiments, only the first coronal portion (31) may be excised to provide the first passthrough periphery (32) defining the first passthrough opening (23) or only the second coronal portion (33) may be excised to provide the second passthrough periphery (34) defining the second passthrough opening (27).

Now referring primarily to FIGS. 4 through 6, each of the first and second passthrough peripheries (32)(34) can have a labial passthrough periphery (35) and a lingual passthrough periphery (36). In particular embodiments, the labial passthrough periphery (35) can, but need not necessarily, be disposed in contact with labial surface of the one or more molars (20), premolars (21), and canines (22) of the teeth (10) in the dental arch (4A) which pass through the corresponding first or second passthrough opening (23)(27). The lingual passthrough periphery (36) can, but need not necessarily, be disposed to contact the lingual surface of the one or more molars (20), premolars (21), and canines (22) of the teeth (3) in the dental arch (4A) which pass through the corresponding first or second passthrough opening (23)(27). In particular embodiments, the labial passthrough periphery (35) or the lingual passthrough periphery (36), or both, can be disposed at the gum line (37) separating the gums (17) from the coronal part (38) of the teeth (10). In particular embodiments, the labial passthrough periphery (35) or the lingual passthrough periphery (36), or both, can be disposed a distance (39) from the gum line (37) to provide a gap (40) between the labial passthrough periphery (35) or the lingual passthrough periphery (36) and the corresponding labial surface or lingual surface of the one or more molars (20), premolars (21), and canines (22) of the teeth (10) in the dental arch (4A) which pass through the first or second passthrough opening (23)(27).

As one illustrative example, with reference to FIG. 4, an embodiment can dispose the labial passthrough periphery (35) on the labial surface of the one or more molars (20), premolars (21), and canines (22) of the teeth (10) in the dental arch (4A) which pass through the corresponding first or second passthrough opening (23)(27) to correspondingly overlay a passthrough periphery margin (41) over the labial surface of the one or more molars (20), premolars (21), and canines (22) of the teeth (10) in the dental arch (4A).

Now referring primarily to FIG. 6, the lingual passthrough periphery (36) can be disposed a distance (39) from the gum line (37) to provide a gap (40) between the lingual passthrough periphery (36) and the corresponding lingual surface of the one or more molars (20), premolars (21), and canines (22) of the teeth (3) in the dental arch (4A). As an illustrative example, the gap (40) can be sufficient to generally prohibit contact of the lingual passthrough periphery (36) from contacting the lingual surface of the one or more molars (20), premolars (21), and canines (22) of the teeth (10) in the dental arch (4A).

Again, referring primarily to FIGS. 1 through 7, particular methods of making a dental retainer (1) can include disposing an aperture (42) in the retainer body (2) to expose a portion of one or more of the upper incisors (43) (right maxillary lateral incisor (44), right maxillary central incisor (45), left maxillary central incisor (46), left maxillary lateral incisor (47)). The aperture (42) can be formed by excising a third coronal portion (48) of the retainer body (2). The third coronal portion (48) can be defined as a portion of the retainer body (2) overlaying in whole or in part the labial or lingual surfaces of the upper incisors (43) (or both the labial and lingual surfaces of the upper incisors). The excision of the third coronal portion (48) results in the configuration of an aperture periphery (49) which defines the aperture (42). The aperture periphery (49) can have a labial aperture periphery (50) and a lingual aperture periphery (51). In particular embodiments, the labial aperture periphery (50) can be disposed to contact the labial surface of the upper incisors (43) of the teeth (3) in the dental arch (4A) or the lingual aperture periphery (51) can be disposed to contact the lingual surface (9) of the upper incisors (43) of the teeth (3) in the dental arch (4A), or both. In further particular embodiments, the labial aperture periphery (50) can be disposed at or adjacent the gum line (37) of the labial surface of one or more upper incisors (43) or the lingual aperture periphery (51) can be disposed at or adjacent the gum line (37) of the lingual surface (9) of the one or more upper incisors (43), or both.

Now referring primarily to FIGS. 1 through 6, in particular embodiments, the retainer body (2) can, but need not necessarily, be configured to overlay the labial and incisal surfaces (52) of the upper incisors (43) of the teeth (3) (as shown in the examples of FIGS. 4 through 6). This can be achieved by excising the third coronal portion (48) (as shown in the example of FIG. 1) to dispose the aperture (42) over the lingual surface of the upper incisors (43) of the teeth (3) in the dental arch (4A). The excision of the third coronal portion (48) defines a third coronal cap periphery (53) which correspondingly defines the aperture periphery (49) that can include a lingual aperture periphery (51) which can approach the gum line (17) or can contact the lingual surface of the upper incisors (43) and a labial aperture periphery (50) which disposes the retainer body (2) at or over the incisal surfaces (52) of the upper incisors (43) of the teeth (3).

Figure 11:
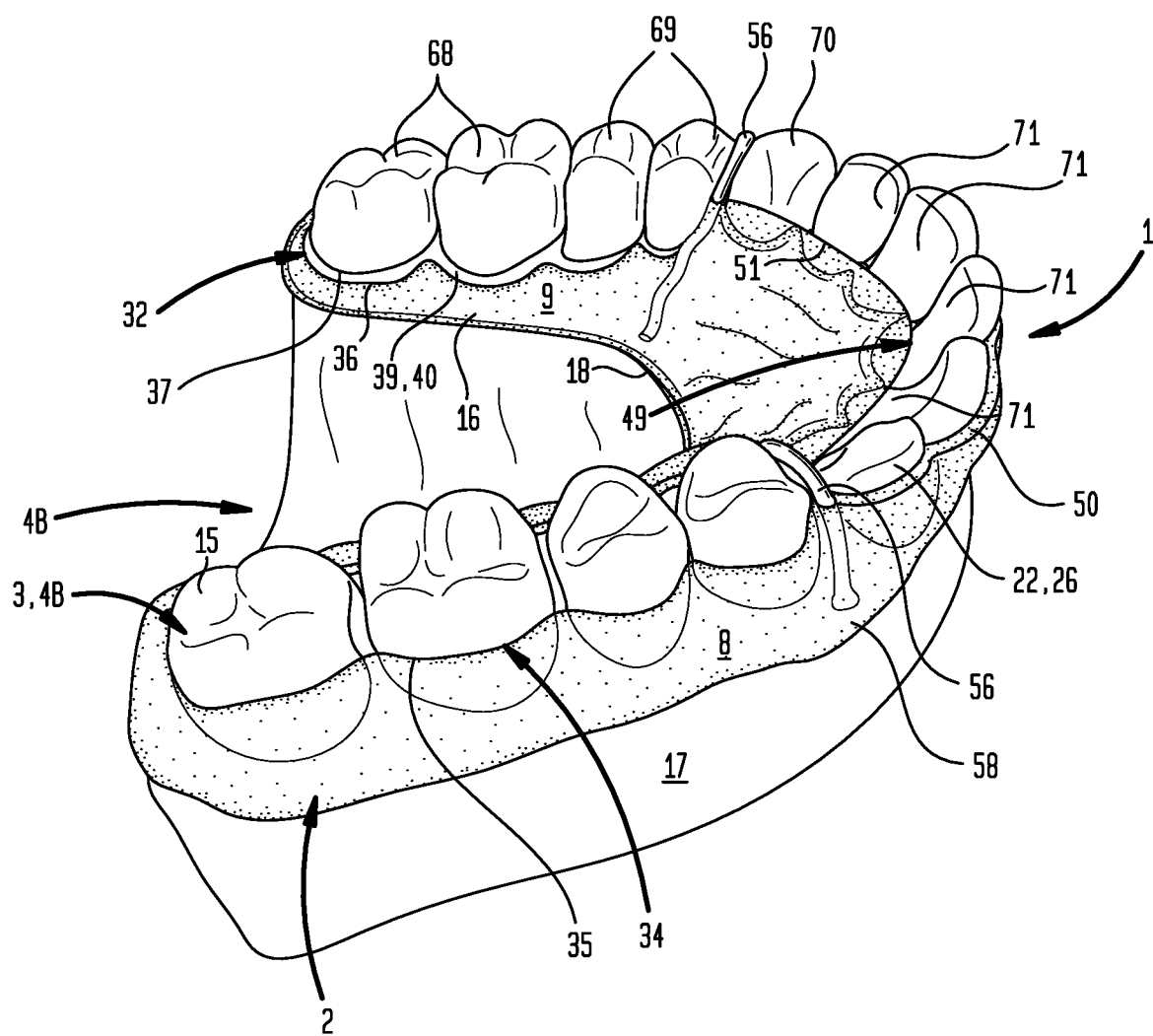
FIG. 11 is a side perspective view of a particular embodiment of a dental retainer for a mandibular dental arch.

In particular embodiments, the aperture (42) can be adapted to allow corresponding lower incisors (71)(as shown in the example of FIG. 11) to contact the lingual surface of the upper incisors (43).

Now referring primarily to FIGS. 1 through 3 and 7, in particular embodiments, the method of making a dental retainer (1) can further include trimming the retainer peripheral edge (18) to afford a palatal portion (55) of the retainer body (2) adapted to overlay substantially the entirety of the palate (as shown by broken line PM) or a part of the palate of the mouth as shown in solid object line. As shown in the illustrative example of FIGS. 1 through 3, the palatal portion (55) of the retainer body (2) can extend from the retainer peripheral edge (18) or (PM) to the aperture periphery (49) disposed on or adjacent the lingual surface of the one or more upper incisors (43) in the dental arch (4A).

Now referring generally to FIGS. 1 through 7, particular methods of making a dental retainer (1) can include connecting one or more tethers (56) between a palatal portion (55) and a facial portion (58) of the retainer body (2). The palatal portion (55) can be defined as that portion of the retainer body (2) configured to abut or lie adjacent the palate of the mouth. The facial portion (58) can be defined as the portion of the retainer body (2) which abuts or is adjacent to the cheeks and lips. The one or more tethers (56) can, but need not necessarily, be disposed interproximal, or on or proximate the line angle or junction of adjacent teeth (10) in the dental arch (4A). In the illustrative example of FIGS. 3 through 6, the method includes disposing a pair of tethers (56) on or proximate the line angle or junction of the premolars (21) and the canines (22) of the teeth (3).

In particular embodiments, the tether (56) can be an integral component of a one piece retainer body (2) remaining after excision of the coronal portions (31)(33)(48) of the retainer body (2) as above described, or be discrete components molded into the retainer body (2) by disposing the one or more tethers (56) over the dental cast (6) in a desired location prior to forming the plastic (7) of the retainer body (2), or the tether (56) can be a discrete component attached or adhered to the retainer body (2) after the coronal portions (31)(33)(48) have been excised from the retainer body (2). The one or more tethers (56) can comprise or consist of: a fiber, a plastic, a metal, a laminate, a composite material or combinations thereof. In the illustrative embodiment of FIGS. 3 through 6, the one or more tethers (56) comprises a metal wire having opposed ends adhered respectively to the palatal portion (55) and a facial portion (58) of the retainer body (2) with an amount of adhesive, such as a thermoplastic resin.

Now referring primarily to FIG. 7, in particular embodiments, the method of making a dental retainer (1) can include disposing a layer of polymer (65) over a dental cast (6) and the one or more tethers (56). In particular embodiments, the one or more tethers (56) can be disposed over the dental cast (6) in a desired location. The one or more tethers (56) can comprise a metal wire having opposed ends. The opposed ends of the one more tethers (56) can be disposed respectively on the palatal portion (55) and on the facial portion (58) of the dental cast (6). A layer of curable polymer (65) can be disposed over the dental cast (6) and the one or more tethers (56) to form the retainer body (2). After curing, the retainer body (2) can be disengaged from the dental cast (6). One or more of the first coronal portion (31), second coronal portion (33), and the third coronal portion (48) can be excised from the retainer body (2) to dispose the first passthrough periphery (32), second passthrough periphery (34), and aperture (42), respectively, those elements being previously described. The resulting retainer body (2) can further be trimmed to afford the retainer peripheral edge (18)

Again, referring generally to FIGS. 1 through 7, with primary reference to FIG. 7, in particular embodiments, the method of making a dental retainer (1) can include three-dimensional scanning or imaging (66) of the dental arch (4) using optical technologies such as: confocal laser microscopy, active wavefront sampling, accordion fringe inferometry, and optical coherent tomography to generate a digital model (59) of a dental arch (4A) or (4B).

In particular embodiments, the method can further include use of an additive build up process, to produce a replica model (60) of a dental arch (4A)(4B) which can be utilized as, or in substitution or replacement of, the dental cast (6), above described, followed by disposing thermoformable plastic (7) or by applying a layer of polymer (65) on the replica model (60) to form embodiments of the retainer body (2), as previously described. The term "additive build up process" for the purposes of this invention means any process of layering one or more materials to produce a three-dimensional object, and without limiting the breadth of the foregoing, particular embodiments of the additive build up process can, but need not necessarily, include the conventional process referred to as three-dimensional printing ("3D printing") in which the three-dimensional object can be created from a digital model (59) using a three-dimensional materials deposition apparatus (61), such as a three-dimensional printer, laying down successive layers of a build material (64).

The term "three dimensional object" for the purposes of this invention means any configuration of a three-dimensional object and without limiting the breadth of the forgoing includes replica models (60) of a dental arch (4A)(4B) or embodiments of the dental retainer (1), as above described.

Again, referring primarily to FIG. 7, particular embodiments can include a digital model (59), a three-dimensional materials deposition apparatus or materials printer (61), a materials deposition apparatus controller (62), and a dental retainer (1). The digital model (59) obtained by three-dimensional scanning or imaging (66) of the dental arch (4) provides a data representation of the dental arch (4) to be rendered in tangible form or from which the dental retainer (1) can be directly rendered in tangible form by operation of the three-dimensional materials deposition apparatus (61) or materials printer.

Again, referring primarily to FIG. 7, as to particular embodiments of the invention, a materials deposition apparatus controller (62) can run a three-dimensional object production application (63) which reads the digital model files, accepts parameter and preference input from the user, performs a series of detailed calculations and transmits to the three-dimensional materials deposition apparatus (61) (which as to particular embodiments can be a three dimensional printer such as a Form 2350® available from Formlabs, Inc., or a three dimensional printer assembly as described in U.S. Pat. No. 7,037,382, hereby incorporated by reference herein, or similar apparatus) commands and provides information needed to produce embodiments of the replica model (60) or embodiments of the dental retainer (1).

In particular, the three-dimensional object production application (63) may allow the user to arrange one or more digital models (59) in a virtual volume representing the actual fabrication space within the three-dimensional materials deposition apparatus (61). The three-dimensional object production application (63) can then slice the array of digital models (59) into a plurality of layers, each of a predetermined thickness, which are transmitted to control electronics housed within the three-dimensional materials deposition apparatus (61).

Particular embodiments of the three-dimensional materials deposition apparatus (61) can, but need not necessarily, comprise a three-dimensional printer (61) having an array of jet type print heads which deposit a binder liquid (67) onto successive layers of a build material (64). Where the binder liquid (67) combines with the build material (64), the powder reacts and hardens. By controlling the placement of binder liquid (67) from these print heads, the configuration of the replica model (60) or dental retainer (1) can be physically reproduced by an additive build up process. Further details of binding a build material (64) with a binder liquid (67) to form a replica model (60) or dental retainer (1) are disclosed in U.S. Pat. Nos. 5,340,656 and 5,387,380, hereby incorporated by reference herein.

In particular embodiments, the build material (64) can comprise methacrylic acid esters, or a combination of methacrylic acid esters and phosphine oxides as a photoinitiator which exposed to ultraviolet light initiates hardening of the methacrylic acid esters, for example, Dental SG Resin liquid available from Formlabs, Inc. A three-dimensional object of the present invention, including embodiments of the replica model (60) of dental arch (4), or embodiments of the dental retainer (1), may be built using these build materials (64) deposited in successive layers using a three-dimensional printing system similar to various embodiments of U.S. Pat. Nos. 6,658,314, 7,604,768 or 7,500,846, each hereby incorporated by reference herein.

In particular embodiments, the build material (64) can comprise a plastic filament. The plastic filament can, for example, comprise acrylonitrile butadiene styrene (ABS) or polylactic acid (PLA) provided as strands of filament of about one millimeter to about three millimeters in diameter that unwind from a coil or spool. The three-dimensional materials deposition apparatus (61) can comprise a fused deposition modeling (FDM) or, more generally, fused filament fabrication (FFF) printer. The plastic filament can be supplied to a print head with an extrusion nozzle, such as a gear which pulls the plastic filament off the spool and into the extrusion nozzle. The extrusion nozzle can be adapted to regulate flow between on and off. The extrusion nozzle (or an upstream portion of the print head) is heated to melt the plastic filament as it is passed into, or through, the extrusion nozzle so that it liquefies. The pointed extrusion nozzle deposits the liquefied material in lines (for example, in lines that are about 0.1 millimeters across).

As to particular embodiments, the build material(s) (64) used in the additive build up process of embodiments of the replica model (60) or dental retainer (1), when cured, can, but need not necessarily, have Shore A or Shore D hardness which falls in a wide range of hardnesses. The Shore A hardness can, as an example, be between about 40 to about 100 or a Shore D harness of between about 0 and about 90. However, the above illustrative Shore A or Shore D hardness or the resulting tensile strength is not intended to preclude embodiments which fall outside of these ranges.

Now referring generally to FIGS. 4 through 6, methods of using a dental retainer (1) can include one or more of correspondingly disposing the teeth (3) of a dental arch (4A) in a plurality of dental impressions (10) of a retainer body (2), and correspondingly passing one or more molars (20), premolars (21) and canines (22) of the teeth (3) in the dental arch (4A)(4B) through one or a pair of passthrough openings (19) in the retainer body (2). The methods can, but need not necessarily, include correspondingly disposing a first or second passthrough periphery (32)(34) of one or the pair of passthrough openings (19) a distance from a lingual surface of the one or more molars (20), premolars (21) and canines (22) of the teeth (3) disposed in the retainer body (2). The method can, but need not necessarily, include disposing an aperture (42) in the retainer body (2) over the lingual surface of upper incisors (43) of the teeth (3) in the maxillary dental arch (4A), the aperture (42) located to allow corresponding lower incisors (43) to contact the lingual surface of the upper incisors (43). The method can, but need not necessarily, include disposing a tether (56) connecting a palatal portion (55) and a facial portion (58) of the retainer body (2) between a pair of the teeth (3) in the dental arch (4)(4A)(4B). In yet further embodiments, methods of using the dental retainer (1) can include correspondingly disposing a pair of tethers (56) each connecting a palatal portion (55) and a facial portion (58) of the retainer body (2) between the premolars (21) and canines (22) of the teeth (3).

Now referring generally to FIGS. 8 through 11, the above methods of making a dental retainer (1) can be applied to the production of a retainer body (2) to receive the dentition (3) of the mandibular dental arch (4B). Again, referring primarily to FIG. 7, the method of making a dental retainer (1) for the mandibular dental arch (4B) can include making a negative impression (5) of the dentition (3) of the mandibular dental arch (4B) and disposing formable plastic (7) over the dental cast (6) of the negative impression (5), as that process has been previously described herein.

Figure 8:
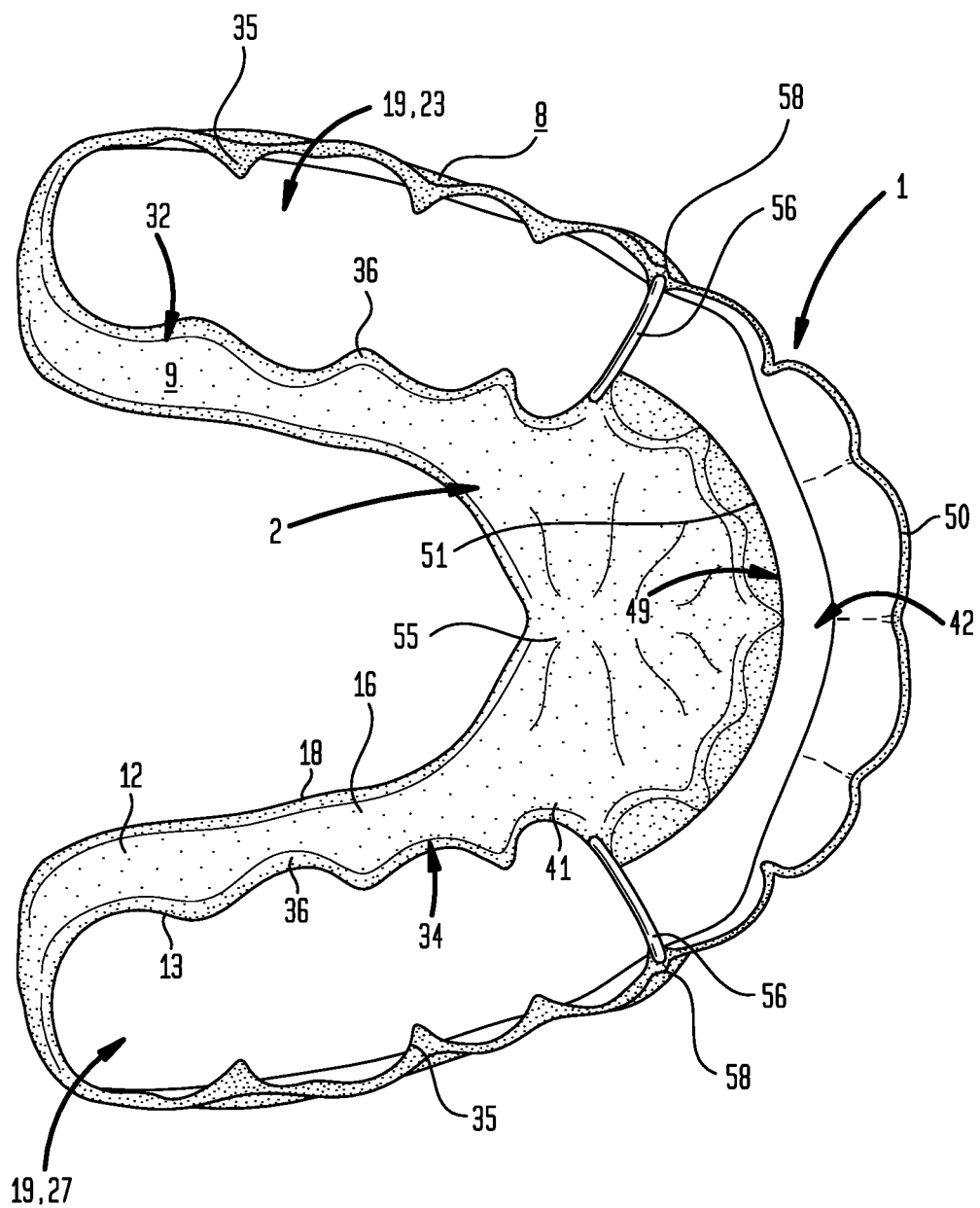
FIG. 8 is a top view of another particular embodiment of a dental retainer for a mandibular dental arch.
Figure 9:
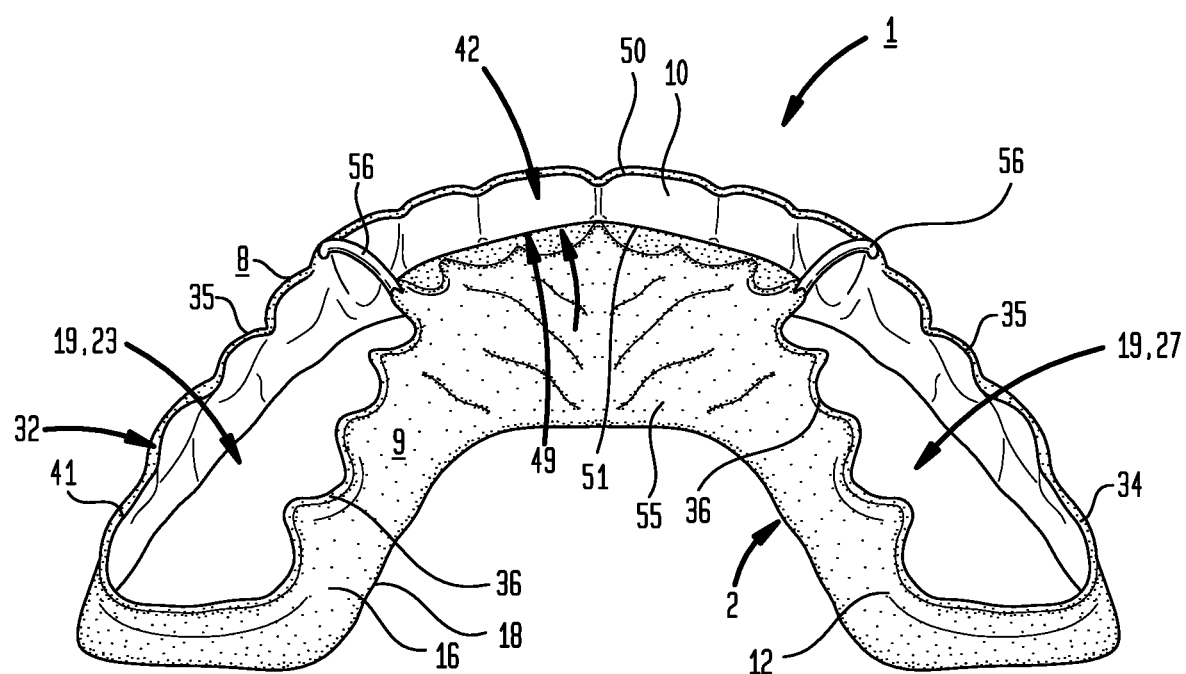
FIG. 9 is a back perspective view of a particular embodiment of a dental retainer for a mandibular dental arch.
Figure 10:
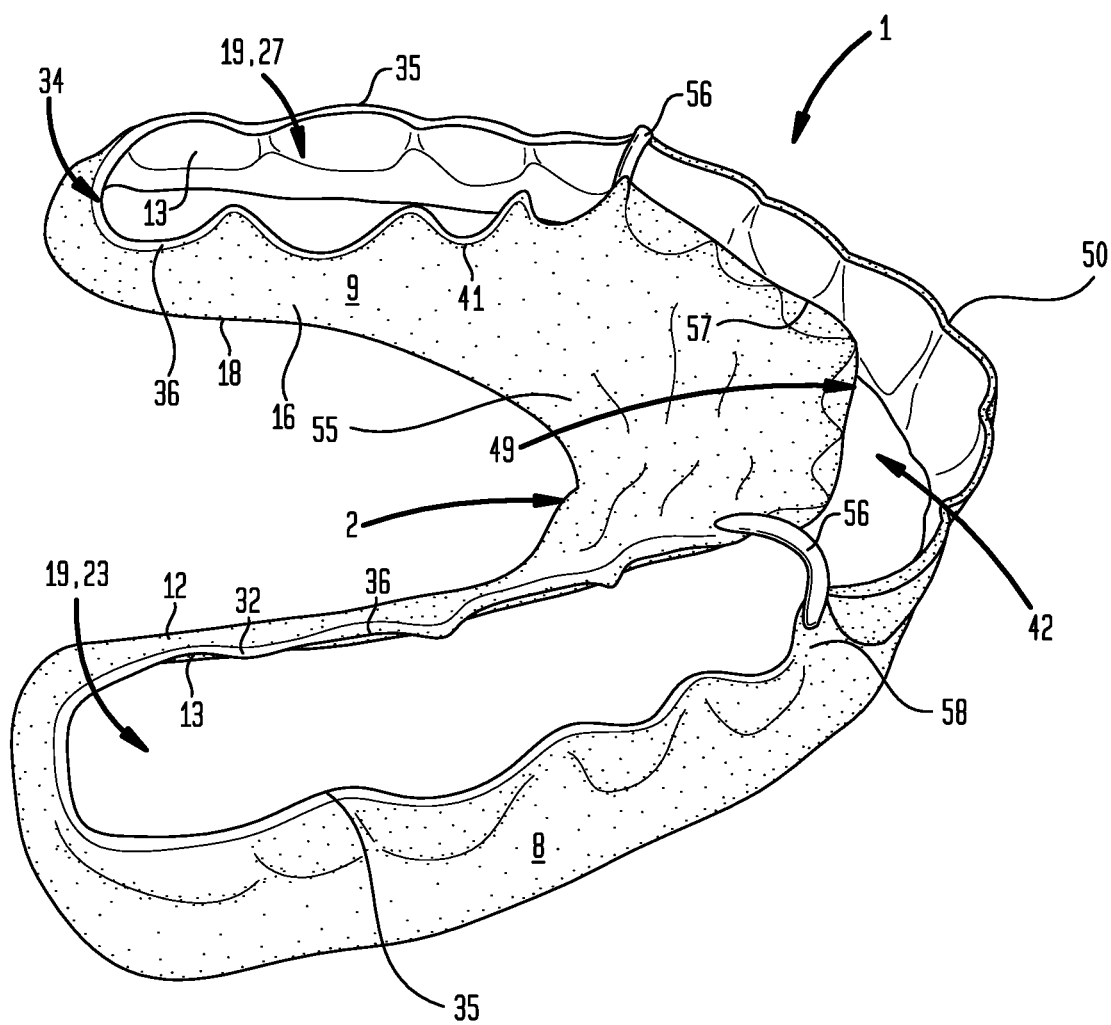
FIG. 10 is a side perspective view of a particular embodiment of a dental retainer disposed on a mandibular dental arch.

Again, referring primarily to FIGS. 8 through 1 the resulting retainer body (2) can have an outer surface (12) facing the mouth cavity and an inner surface (13) that is adjacent to, abuts or faces the dentition (3) of the dental arch (4). The resulting retainer body (2) can have a depth (14) (similar to the illustrative example of FIG. 1) defined by a distance between the outer surface (12) of the retainer body (2) disposed over the crowns (15) of the teeth (10) and the peripheral edge (18) of the retainer body (2) disposed over a portion of the gums (17). In particular embodiments, the resulting retainer body (2) can be trimmed to provide a peripheral edge (18) which contacts the gums (17) and a portion of the floor of the mouth below the tongue when the teeth (3) of the mandibular arch (4B) are received in the retainer body (2) and extends to a peripheral edge (18).

Again referring to FIGS. 8 through 11, the method of making a retainer body (2) for the mandibular dental arch (4B) can further include disposing a pair of passthrough openings (19) in the retainer body (2), each of the pair of passthrough openings (19) can be adapted to correspondingly allow passage of one or more mandibular molars (68), premolars (69), and canines (70) of the teeth (3) in the mandibular dental arch (4B) through the retainer body (2). The pair of passthrough openings (19) can include a first passthrough opening (23) adapted to allow passage of one or more of the molars (68), premolars (69) and canines (70) on the left side of the mandibular dental arch (4B). The pair of passthrough openings (19) can include a second passthrough opening (27) adapted to allow passage of one or more of the mandibular molars (68), premolars (69) and canines (70) of the right mandibular dental arch (4B). Particular embodiments can include only a first or a second passthrough opening (23)(27). A detailed description of the first or second passthrough opening (23)(27) has been provided above, and that description can be applied to the retainer body (2) for the mandibular dental arch (4B).

Again, referring primarily to FIGS. 8 through 11, particular methods of making a dental retainer (1) for the mandibular dental arch (4B) can further include disposing an aperture (42) in the retainer body (2) to expose a portion of one or more of the lower incisors (71). The aperture (42) can be formed by excising a third coronal portion (48) of the retainer body (2). The third coronal portion (48) can be defined as that portion of the retainer body (2) overlaying the labial and lingual surfaces of the lower incisors (71). The excision of the third coronal portion (48) results in the configuration of an aperture periphery (49) which defines the aperture (42). The aperture periphery (49) can have a labial aperture periphery (50) and a lingual aperture periphery (51). In particular embodiments, the labial aperture periphery (50) can be in contact with the labial surface of the lower incisors (68) of the teeth (10) in the dental arch (4B) or the lingual aperture periphery (51) can be in contact with the lingual surface of the lower incisors (68) of the teeth (10) in the dental arch (4B), or both. In further particular embodiments, the labial aperture periphery (50) can be disposed at or adjacent the gum line (37) of the labial surface of one or more lower incisors (71) or the lingual aperture periphery (51) can be disposed at or adjacent the gum line (37) of the lingual surface (9) of the one or more lower incisors (68), or both. In particular embodiments, the aperture (42) can be adapted to allow corresponding upper incisors (43) to contact the lingual surface of the lower incisors (71). A detailed description of the aperture (42) has been provided above, and that description can be applied to the retainer body (2) for the mandibular dental arch (4B).

Particular methods of making a dental retainer (1) for a mandibular dental arch (4B) can further include connecting one or more tethers (56) between a palatal portion (55) and a facial portion (58) of the retainer body (2). The one or more tethers (56) can, but need not necessarily, be disposed interproximal, on or proximate the line angle or junction of adjacent teeth (3) in the dental arch (4B). In the illustrative example of FIGS. 3 through 6 the method includes disposing a pair of tethers (56) between the premolars (69) and the canines (70) of the teeth (3). A detailed description of the tether (56) has been provided above, and that description can be applied to the retainer body (2) for the mandibular dental arch (4B).

Particular methods of making a dental retainer (1) for a mandibular dental arch (4B) can further include three-dimensional scanning or imaging (66) of the dental arch (4) using optical technologies such as: confocal laser microscopy, active wavefront sampling, accordion fringe inferometry, and optical coherent tomography to generate a digital model (59) of the mandibular dental arch (4B). The method can, but need not necessarily, further include use of an additive build up process, to produce a replica model (60) of a mandibular dental arch (4B) which can be utilized as, or in substitution or replacement of, the dental cast (6) above described followed by disposing formable plastic (7) on the replica model (60) to form embodiments of the retainer body (2), the process being described above.

Further particular embodiments can include a digital model (59), a three-dimensional materials deposition apparatus (61) or materials printer, a materials deposition apparatus controller (62), and a dental retainer (1). The digital model (59), obtained by three-dimensional scanning or imaging (66) of the mandibular dental arch (4B), provides a data representation of the dental arch (4B) to be rendered in tangible form or from which the dental retainer (1) can be directly rendered in tangible form by operation of the three-dimensional materials deposition apparatus (61) or materials printer, the process being described above.

As can be easily understood from the foregoing, the basic concepts of the present invention may be embodied in a variety of ways. The invention involves numerous and varied embodiments of a dental retainer and methods for making and using such dental retainer including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such Willis can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "retainer" should be understood to encompass disclosure of the act of "retaining"—whether explicitly discussed or not—and, conversely, were there effectively disclosure of the act of "retaining", such a disclosure should be understood to encompass disclosure of a "retainer" and even a "means for retaining." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the dental retainers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A dental settling retainer, comprising:
   a retainer body having a plurality of dental impressions including a labial surface opposite a lingual surface to receive teeth in a dental arch, said retainer body impressions formed of one material; and
   a pair of passthrough openings on opposite sides in said retainer body, wherein each of said pair of passthrough openings being adapted to correspondingly allow passage of a plurality of molars, premolars or canines of said teeth in said dental arch through said retainer body, each of said pair of passthrough openings defined by a lingual passthrough periphery configured to provide a gap between said lingual passthrough periphery and a gum line of a lingual surface of said plurality of molars, premolars or canines of said teeth in said dental arch and said gap configured to prohibit contact of said lingual passthrough periphery from contacting a lingual surface of said plurality of molars, premolars or canines.

2. The dental settling retainer of claim 1, wherein said retainer body comprises a one-piece retainer body.

3. The dental settling retainer of claim 1, wherein said passthough openings each further comprising a labial passthrough periphery configured to be disposed on a labial surface of said plurality of molars, premolars, or canines of said teeth in said dental arch.

4. The dental settling retainer of claim 1, further comprising an aperture in said lingual surface of said retainer body, said aperture disposed adjacent a lingual surface of upper incisors of said teeth in said dental arch, said aperture adapted to allow corresponding lower incisors to contact said lingual surface of said upper incisors.

5. The dental settling retainer of claim 4, wherein said retainer body extends over an incisal surface of said upper incisors of said teeth in said dental arch terminating in an aperture periphery of said aperture disposed adjacent said lingual surface of upper incisors of said teeth in said dental arch.

6. The dental settling retainer of claim 5, wherein a palatal portion of said retainer body extends to said aperture periphery of said aperture disposed adjacent said lingual surface of upper incisors of said teeth in said dental arch, said palatal portion extending from said lingual surface to overlay substantially the entirety of the palate.

7. The dental settling retainer of claim 4, further comprising one or more tethers connected between a palatal portion and a facial portion of said retainer body, said one or more tethers located between a pair of said teeth in said dental arch.

8. The dental settling retainer of claim 7, wherein said tether comprises a pair of tethers correspondingly disposed between said premolars and said canines of said teeth.

9. A dental settling retainer, comprising:
   a retainer body having a plurality of dental impressions including a labial surface opposite a lingual surface to receive respective teeth in a dental arch; and a pair of passthrough openings on opposite sides in said retainer body, wherein each of said pair of passthough openings being adapted to correspondingly allow passage of a plurality of molars, premolars or canines of said teeth in said dental arch through said retainer body, each of said pair of passthrough openings defined by a labial passthrough periphery and a lingual passthrough periphery, wherein either said labial passthrough periphery or said lingual passthrough periphery is disposed at a gum line a distance away from a lingual surface or a labial surface of said plurality of molars, premolars, or canines of said teeth in said dental arch, said distance configured to prohibit contact of said labial passthrough periphery or said lingual passthrough periphery from contacting said lingual or labial surface of said plurality of molars, premolars or canines.

10. The dental settling retainer of claim 9, further comprising an aperture in said lingual surface of said retainer body, said aperture disposed adjacent a lingual surface of upper incisors of said teeth in said dental arch, said aperture adapted to allow corresponding lower incisors to contact said lingual surface of said upper incisors.

11. The dental settling retainer of claim 10, wherein said retainer body extends over labial incisal surfaces of said upper incisors of teeth in said dental arch terminating in an aperture periphery of said aperture disposed adjacent said lingual surface of upper incisors of said teeth in said dental arch.

12. The dental settling retainer of claim 11, wherein a palatal portion of said retainer body extends to said aperture periphery of said aperture disposed adjacent said lingual surface of upper incisors of said teeth in said dental arch.

13. The dental settling retainer of claim 10, further comprising one or more tethers connected between a palatal portion and a facial portion of said retainer body.

14. The dental settling retainer of claim 13, wherein said tether comprises a pair of tethers correspondingly disposed between said premolars and said canines of said teeth.

* * * * *